June 2, 1925.
W. STEWART
1,540,040
SPRAY NOZZLE FOR REFRIGERATION MACHINES
Original Filed May 16, 1921
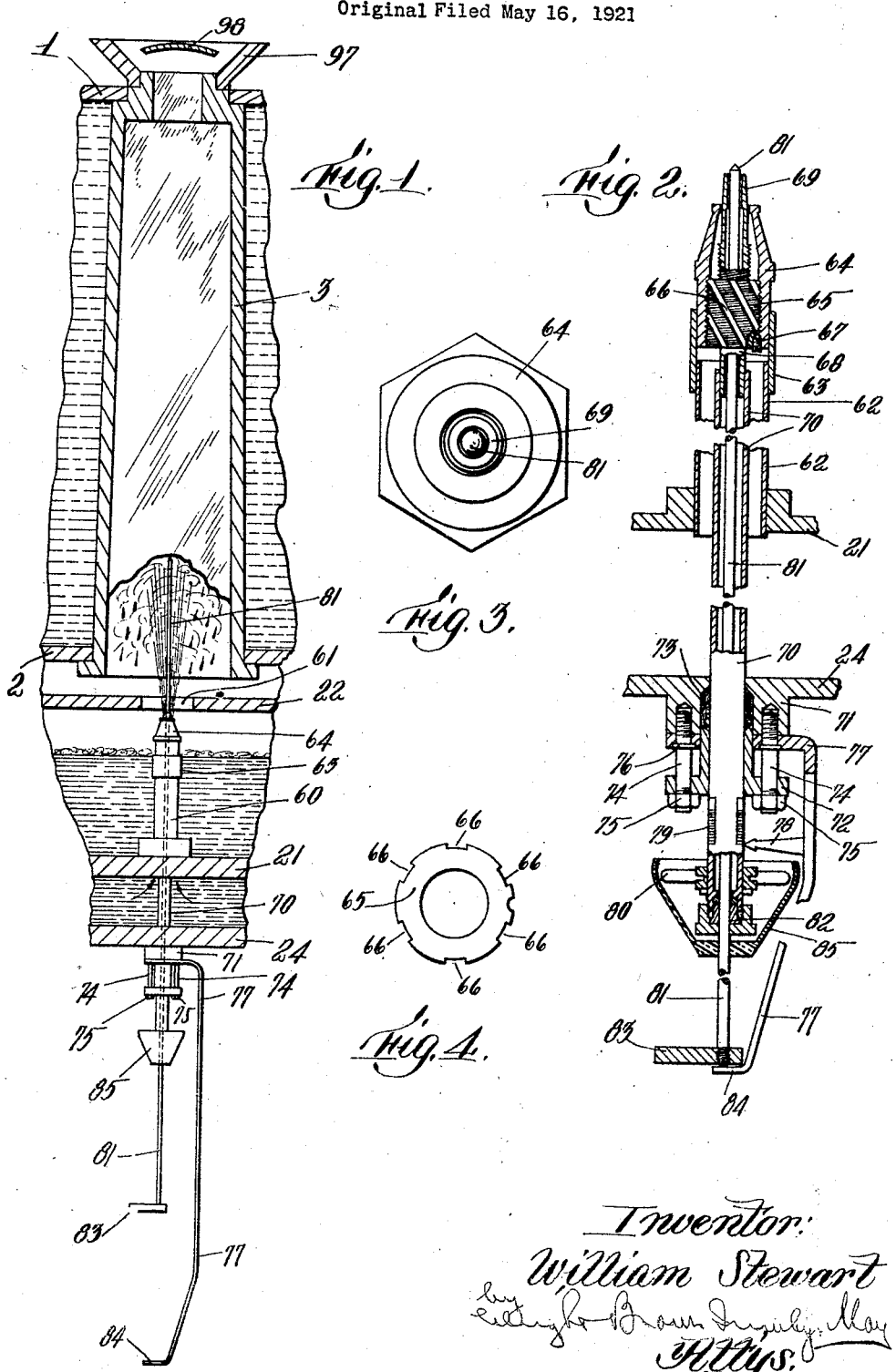
Inventor:
William Stewart Patented June 2, 1925.

1,540,040

UNITED STATES PATENT OFFICE.

WILLIAM STEWART, OF PORTLAND, MAINE.

SPRAY NOZZLE FOR REFRIGERATION MACHINES.

Original application filed May 16, 1921, Serial No. 469,903. Divided and this application filed November 27, 1923. Serial No. 677,249.

*To all whom it may concern:*

Be it known that I, WILLIAM STEWART, a citizen of the United States, residing at Portland, in the county of Cumberland and State of Maine, have invented new and useful Improvements in Spray Nozzles for Refrigeration Machines, of which the following is a specification.

This invention relates to nozzles more particularly designed for spraying a liquid into a refrigerating atmosphere in a machine of the general type disclosed in my application for United States Letters Patent filed May 16, 1921, Serial No. 469,903 entitled "Process and machine for refrigeration," of which this application is a division.

The parent application above mentioned discloses a refrigerating machine in which the water or other liquid to be congealed is sprayed from beneath into the open end of a container or cell, the walls of which are cooled by refrigerant, the whole being enclosed in a casing which is exhausted of air and maintained at as low internal pressure as possible. The cell gradually becomes filled with material congealed from the sprayed liquid in the operation of the apparatus, but the progress of the filling, of the cell is not visible from without the casing, nor is it possible to open the casing for inspection without breaking the vacuum therein and thus impairing or discontinuing the congealing operation. For this reason the nozzle is provided with a testing rod which may be moved axially thereof so as to project its upper end within the cell until it impinges on and is stopped by the lower end of the congealed cake being formed therein. The distance to which the rod may be moved upwardly before it is thus stopped indicates to the operator, who moves the rod by hand, the completeness to which the cell is filled at any particular time without in any way disturbing the operation of the apparatus.

For a more complete description of this invention, reference may be had to the accompanying drawings, in which—

Figure 1 is a fragmentary vertical section through the machine showing a single container or cell.

Figure 2 is a vertical section through the spray nozzle and test rod.

Figure 3 is an end view of the same parts.

Figure 4 is an inner or lower end view of the sprayer member.

Referring first to Figure 1, at 3 is indicated a cell to be filled with ice or other congealed material, a suitable refrigerant being circulated externally thereof. At 21 and 22 are shown lower and upper walls of a supply tank for the liquid to be sprayed and at 24 is shown a lower wall between which and the wall 21 is a pressure chamber into which the liquid is pumped from the supply tank and from which the liquid passes through the spray nozzles such as 60, all in the manner more fully shown and described in the parent application for patent hereinbefore mentioned. The wall 22 is perforated as at 61, the perforation being of larger diameter than the spray nozzle so that the spray may pass upwardly therethrough and the uncongealed liquid drain back into the supply tank around the spray. The cell 3 is enclosed in a casing (not herein shown) to the supply and pressure tanks, acting to close the lower end thereof. The cell thus being entirely enclosed, the progress of the formation of the congealed cake therein can not be seen without opening the casing, which, of course, would admit air to its interior and interfere with the operation of the apparatus. The spray nozzle has therefore been so designed that a test rod may be pushed up by hand therethrough into the cell, the distance to which it may be pushed before it contacts with and is stopped by the lower end of the solid cake in the cell indicating to the operator the extent to which the cell is filled.

The construction of each spray nozzle is shown in detail in Figure 2. It comprises an outer casing 62 which passes downwardly an outer casing 62 which passes through a perforation in the plate 21 and has fixed thereto at its upper end, by means of a union 63, a nozzle element 64. This nozzle element is internally screw threaded for the reception of a sprayer 65 having spiral or inclined flutings 66 therein, which form passageways for the liquid to impart a rotary motion to the spray and to divide it finely. The sprayer 65 is fixed within the nozzle element 64 by means of a set screw 67 fitting in mating grooves in the sprayer and the nozzle element. Threaded in the sprayer 65 is a sleeve 68 terminating at its upper end in a tapered needle valve 69 which projects upwardly through the end of the nozzle 64. The sleeve 68 is fixed to a tube 70 of considerably smaller diameter than the tube 62 which passes downwardly through the supply chamber and through a stuffing box 71 carried on the lower face of the base plate 24, this stuffing box being provided with a tightening gland 72 and a packing 73. This gland is pressed against the packing 73 by means of a series of studs 74 having units 75 threaded on their lower end. These studs have collars 76 formed thereon for retaining a bracket element 77 which projects downwardly below the tube 70 for a purpose to be later described. Intermediate the ends of this bracket is fixed a pointer 78 projecting in proximity to an index mark 79 formed on the tube 70. A hand wheel 80 is fixed adjacent the lower end of the tube 70 by which this tube may be turned to adjust the position of the element 69 within the nozzle. It is evident from this construction that the liquid under pressure may pass up around the pipe 70 within the sleeve 62 and thence through the flutings 66 and out through the nozzle element 64 around the valve member 69, this construction forming in effect a needle valve spray nozzle.

In order to provide means for determining the rate of formation of the congealed cake within the cell, a test rod shown at 81 is passed up through the tube 70 and the valve 69, and may be projected upwardly into the cell as shown in Figure 1 until it contacts with the solid contents thereof. This rod 81 projects through a stuffing box 82 on the lower end of the pipe 70 and has fixed at its lower end a lifting handle 83 accessible to manual actuation. When the rod is in its lowered position, this handle rests on the lower end of the bracket arm 77 as shown in Figure 2, which is turned thereunder at 84 for this purpose.

Having thus described one embodiment of this invention, it should be evident to those skilled in the art that many changes and modifications might be made therein without departing from its spirit or scope as defined by the appended claims.

I claim:

1. An apparatus comprising a spray nozzle, and a testing rod movable axially through said nozzle.

2. An apparatus comprising a spray nozzle, and a testing rod movable through said nozzle.

3. A device of the class described comprising a pipe, a nozzle fixed to one end of said pipe, a sprayer in said nozzle having spaced grooves longitudinally thereof for the passage of fluid, a sleeve longitudinally adjustable through said sprayer and having a tapered upper end forming a needle valve for the outer end of said nozzle, and a testing rod passing through said sleeve and movable axially thereof.

4. A device of the class described comprising a nozzle, a needle valve for said nozzle, and a rod movable axially through said valve.

5. A device of the class described comprising a nozzle, a needle valve for said nozzle, means for adjusting said needle valve relative to said nozzle, a rod positioned axially within said valve, and means by which said rod may be moved axially of said valve.

6. A device of the class described comprising a nozzle, a sprayer fixed within said nozzle, a needle valve adjustable axially through said sprayer and in cooperative relation to said nozzle, and a rod manually movable axially through said valve to be projected and retracted beyond the end thereof.

7. A device of the class described comprising a nozzle, a sprayer having flutes inclined to the axis thereof fixed in said nozzle to define inclined fluid passages toward the end of said nozzle, a needle valve adjustable axially of said sprayer and having a conical end cooperating with said end of said nozzle, and a rod axially movable through said valve projectable and retractable beyond the conical end thereof.

In testimony whereof I have affixed my signature.

WILLIAM STEWART.